(12) United States Patent
Belostotsky et al.

(10) Patent No.: US 6,856,786 B2
(45) Date of Patent: Feb. 15, 2005

(54) QUALITY OF SERVICE SCHEDULING SCHEME FOR A BROADBAND WIRELESS ACCESS SYSTEM

(75) Inventors: Arkady Belostotsky, Maele Adumim (IL); Baruch Leiman, Jerusalem (IL)

(73) Assignee: Vyyo Ltd., Palo Alto, CA (US)

( * ) Notice: Subject to any disclaimer, the term of this patent is extended or adjusted under 35 U.S.C. 154(b) by 553 days.

(21) Appl. No.: 09/771,165

(22) Filed: Jan. 26, 2001

(65) Prior Publication Data

US 2002/0052205 A1 May 2, 2002

Related U.S. Application Data

(60) Provisional application No. 60/178,197, filed on Jan. 26, 2000.

(51) Int. Cl.[7] ............................................. H04H 1/00
(52) U.S. Cl. ..................................... 455/3.03; 725/97
(58) Field of Search .............................. 455/3.03, 3.04, 455/3.06; 725/97, 91, 95, 101, 103

(56) References Cited

U.S. PATENT DOCUMENTS

| | | |
|---|---|---|
| 4,010,465 A | 3/1977 | Dodington et al. |
| 4,099,121 A | 7/1978 | Fang |
| 4,385,384 A | 5/1983 | Rosbury et al. |
| 5,052,024 A | 9/1991 | Moran, III et al. |
| 5,272,700 A | 12/1993 | Hansen et al. |
| 5,311,550 A | 5/1994 | Fouche et al. |
| 5,377,035 A | 12/1994 | Wang et al. |
| 5,408,349 A | 4/1995 | Tsushima et al. |
| 5,471,645 A | 11/1995 | Felix |
| 5,481,542 A | 1/1996 | Logston et al. |
| 5,481,561 A | 1/1996 | Fang |
| 5,487,099 A | 1/1996 | Maekawa |
| 5,510,859 A | 4/1996 | Douglass et al. |
| 5,557,612 A | 9/1996 | Bingham |
| 5,590,409 A | 12/1996 | Sawahashi et al. |
| 5,596,604 A | 1/1997 | Cioffi et al. |
| 5,606,664 A | 2/1997 | Brown et al. |
| 5,625,874 A | 4/1997 | Uchida et al. |
| 5,634,206 A | 5/1997 | Reed et al. |
| 5,666,646 A | 9/1997 | McCollum et al. |

(List continued on next page.)

FOREIGN PATENT DOCUMENTS

| | | |
|---|---|---|
| CA | 2187141 | 4/1998 |
| EP | 0021 544 A1 | 1/1981 |
| EP | 0025 767 A1 | 3/1981 |

OTHER PUBLICATIONS

Golestani, S. (1995) "Network Delay Analysis of a Class of Fair Queueing Algorithms", *IEEE Journal on Selected Areas in Communication* 13(6):1057–1070.

Stiliadis, D. et al. (1998) "Rate–Proportional Servers: A Design Methodology for Fair Queueing Algorithms", *IEEE/ACM Transactions of Networking* 6(2): 164–174.

(List continued on next page.)

*Primary Examiner*—Lester G. Kincaid
*Assistant Examiner*—Sam Bhattacharya
(74) *Attorney, Agent, or Firm*—John W. Carpenter; Reed Smith LLP

(57) ABSTRACT

A dynamic quality of service maintenance system for use with a broadband wireless or cable access system comprising a plurality of wireless modems and a wireless hub, the dynamic quality of service maintenance system maintaining adequate bandwidth for the wireless modems based upon the services provided to the wireless modems by the broadband wireless access system.

18 Claims, 4 Drawing Sheets

U.S. PATENT DOCUMENTS

| | | | |
|---|---|---|---|
| 5,724,385 | A | 3/1998 | Levin et al. |
| 5,734,589 | A | 3/1998 | Kostreski et al. |
| 5,740,525 | A | 4/1998 | Spears |
| 5,752,161 | A | 5/1998 | Jantti et al. |
| 5,796,783 | A | 8/1998 | Crawford |
| 5,809,090 | A | 9/1998 | Buternowsky et al. |
| 5,809,406 | A | 9/1998 | Taki et al. |
| 5,809,427 | A | 9/1998 | Perreault et al. |
| 5,818,825 | A | 10/1998 | Corrigan et al. |
| 5,831,690 | A | 11/1998 | Lyons et al. |
| 5,862,451 | A | 1/1999 | Grau et al. |
| 5,867,528 | A | 2/1999 | Verbueken |
| 5,896,414 | A | 4/1999 | Meyer et al. |
| 5,903,558 | A | 5/1999 | Jones et al. |
| 5,909,384 | A | 6/1999 | Tal et al. |
| 5,937,005 | A | 8/1999 | Obuchi et al. |
| 5,940,743 | A | 8/1999 | Sunay et al. |
| 5,963,843 | A | 10/1999 | Sit et al. |
| 5,963,870 | A | 10/1999 | Chheda et al. |
| 5,974,106 | A | 10/1999 | Dupont |
| 5,978,855 | A | 11/1999 | Metz et al. |
| 5,991,286 | A | 11/1999 | Labonte et al. |
| 6,009,310 | A | 12/1999 | Motohashi |
| 6,035,008 | A | 3/2000 | Kim |
| 6,052,408 | A | 4/2000 | Trompower et al. |
| 6,072,839 | A | 6/2000 | Mondal et al. |
| 6,075,787 | A | 6/2000 | Bobeck et al. |
| 6,111,887 | A | 8/2000 | Daily et al. |
| 6,112,232 | A | 8/2000 | Shahar et al. |
| 6,128,588 | A | 10/2000 | Chacon |
| 6,140,911 | A | 10/2000 | Fisher et al. |
| 6,141,356 | A | 10/2000 | Gorman |
| 6,157,311 | A | 12/2000 | Berkovich |
| 6,160,447 | A | 12/2000 | Huang |
| 6,172,970 | B1 | 1/2001 | Ling et al. |
| 6,181,716 | B1 * | 1/2001 | Lide .................. 370/519 |
| 6,185,227 | B1 | 2/2001 | Sipola |
| 6,195,697 | B1 | 2/2001 | Bowman-Amuah |
| 6,304,906 | B1 * | 10/2001 | Bhatti et al. .............. 709/227 |
| 6,370,153 | B1 * | 4/2002 | Eng .................. 370/438 |
| 6,374,405 | B1 * | 4/2002 | Willard .................. 725/94 |
| 6,459,703 | B1 * | 10/2002 | Grimwood et al. ......... 370/442 |
| 6,594,826 | B1 * | 7/2003 | Rao et al. .................. 725/95 |
| 6,614,799 | B1 * | 9/2003 | Gummalla et al. ......... 370/448 |

OTHER PUBLICATIONS

Stiliadis, D. et al. (1998) "Efficient Fair Queuing Algorithms for Packet–Switched Networks", *IEEE/ACM Transactions of Networking* 6(2):175–185.

Data Over Cable Interface Specifications, Cable Modem Termination System–Network Side Interface Specification, SP–CMTS–NSII01–960702 (Jul. 2, 1996) pp. i–13.

Data–Over–Cable Service Interface Specifications, Cable Modem to Customer Premise Equipment Interface Specification, SP–DMC1–102–980317 (Mar. 17, 1998) pp. i–40.

Data–Over–Cable Service Interface Specifications, Radio Frequency Interface Specification, SP–RFI–I04–980724 (Jul. 24, 1998) pp. i–196.

Data–Over–Cable Service Interface Specifications, Operations Support System Interface Specification SP–OSSI–102–990113 (Jan. 13, 1999) pp. i–14.

Data–Over–Cable Service Interface Specifications, Operations Support System Interface Specification Radio Frequency Interface, SP–OSSI–RFI–103–990113 (Jan. 13, 1999) pp. i–29.

Data–Over–Cable Service Interface Specifications, Baseline Privacy Interface Specification, SP–BPI–102–990319 (Mar. 19, 1999) pp. i–88.

Data–Over–Cable Service Interface Specifications, Baseline Privacy Interface Specification, SP–BPI–102–990731 (Jul. 31, 1999), pp. i–160.

Data–Over–Cable Service Interface Specifications, Radio Frequency Interface Specification, SP–RFIv1.1–103–991105 (Nov. 5, 1999) pp. i–366.

Data–Over–Cable Service Interface Specifications, Operations Support System Interface Specification SP–OSSlv1.1–D01–991115 (Nov. 15, 1999) pp. i–81.

Data–Over–Cable Service Interface Specifications, Operations Support System Interface Specification SP–OSSlv1.1–103–001220 (Dec. 20, 2000) p. ii.

* cited by examiner

QUALITY OF SERVICE SCHEDULING SCHEME FOR A BROADBAND WIRELESS ACCESS SYSTEM

CROSS REFERENCE TO RELATED APPLICATIONS

This invention is related to the following co-pending U.S. provisional patent application, which is incorporated herein by reference, in its entirety:

Belostotsky, Provisional Appilication Ser. No. 60/178,197, entitled "Quality Of Service Scheduling Scheme For A Broadband Wireless Access System,", filed 26 Jan., 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

BACKGROUND OF THE INVENTION

1. Field of Invention

The present invention relates to broadband wireless access systems and amongst other things to a method of dynamic maintenance of quality of service in a broadband wireless access system.

2. Discussion of Background

Point to multi-point fixed broadband wireless access systems over MMDS networks are known in broadcast situations. These networks operate over licensed bands including the MMDS band (2,150 to 2,162 MHz), the WCS band (2,305 to 2,360 MHz) and the ITFS/MMDS bands (2,500 to 2,686 MHz).

A known cable based broadband access system, which operates at a range of between 50 MHz and 864 MHz, but not in the MMDS, WCS, or ITFS/MMDS bands, is the data over cable specification system, which is specified in the data over cable system interface specifications (DOCSIS). An overview of a cable based DOCSIS system is depicted in FIG. 1. A CMTS 10 communicates with a wide area network 20, such as the internet. The CMTS 10 can transmit signals from the wide area network 20 along a cable network 30 through cable modems 40 to CPE 50 (Customer Premise Equipment—intended throughout this document to include a computer and/or all of the equipment at the customer site, such as a LAN—Local Area Network). CPE 50 messages can be transmitted to the wide area network 20 through the cable modem 40 along the cable network 30 to the CMTS 10.

In point to multi-point broadband access systems one central end-point, e.g. the head-end, communicates through a bi-directional link or links with multiple end-points, e.g. the nodes. The number of nodes in communication varies in time and can be none, one or two or more at any specific time.

The link(s) between the head-end and the nodes are combined in one or more channels. The signal path from the central end-point to the nodes is referred to as downstream, while the signal path from the nodes to the central end-point is referred to as upstream.

A single upstream channel can be used to deliver information from a node to the head-end, and a downstream channel is used from the head-end to a node or a group of nodes. If a single upstream channel is used for communication from the nodes(s) to the central point, then only one end-point can sends information on the single upstream channel at any one time.

A known allocation scheme, for scheduling upstream channels and mini-slots in the channels, is referred to as contention-based based allocation. This allocation scheme allows more than a single node to use the same time interval. In such allocation an allocation scheme, there is some probability that more than one node will try to send information on the same upstream channel at the same time. In this case, the information from all or some of the nodes transmitting messages on the same upstream channel at the same time will not be received at the central end-point. These nodes, from which the message is not received, will retransmit the same message until such a time when the central end-point receives that transmission. Further, during the time when it is re-transmitting the same message, the node cannot transmit new messages.

Another known upstream channel allocation scheme is defined DOCSIS. These specifications refer to the case of HFC network. In the DOCSIS system, each upstream channel is assigned a different frequency range. Different channels are used for upstream or downstream directions.

In the DOCSIS scheme there is no need to coordinate the downstream channel, since only the head-end is transmitting in this direction. Further in DOCSIS, the head-end is responsible for the allocation of the upstream channels. These allocations are performed in two general steps, one for the allocation of an upstream channel and the other for the allocation of time intervals in the upstream channels.

The allocation of the time intervals on each upstream channel is also performed by the head-end. The head-end transmits the time interval allocations on the downstream channel in a message called MAP. A single MAP message describes time interval allocation on a single upstream channel for a specific period of time.

The DOCSIS solution uses a fixed upstream channel for each node, which implies that statistical changes to the traffic load may cause a high load on one channel, while not allowing other channels with lower loads to be used to balance higher load channel. Further, if the performance of the current upstream channel of a node becomes unacceptable, e.g. falls below predetermined threshold levels, the node must switch to an alternate channel. This switching process, which includes a search for the best available channel, takes a longtime during which service to the node is interrupted.

When multiple services are supported by the broadband access system, some Quality of Service (QoS) requirements need to be defined which add additional limitations on any allocation scheme or scheduling scheme. The services may include voice IP, broadband video on demand or other services that may require different downstream and upstream bandwidth, with respect to the modem, than the standard IP traffic that comprises Internet communication.

Therefore, it is necessary to schedule upstream communication based upon the specific requirements of each service that is being utilized by the user.

SUMMARY OF THE INVENTION

The present invention provides a method and system for scheduling and allocating the appropriate bandwidth to a plurality of user devices in such a way as to assure adequate bandwidth regardless of the type of service utilized by the user device.

In another embodiment, a scheduler for use broadband wireless access system comprising a plurality of wireless modems and a wireless hub, maintains adequate bandwidth for the wireless modems based upon the services provided to the wireless modems by the broad band wireless access system.

The present invention is embodied as a wireless communication system, comprising, a wireless hub configured to send downstream communications on at least one downstream channel and receive upstream communications from at least one client device on at least one upstream channel, wherein said wireless hub comprises, a timeline, having timed storage allocations for scheduled services to be provided in conjunction with at least one client device that is communicating with said wireless hub, a scheduling mechanism configured to, receive service requests from said client devices, determine available time for provision of the requested service, and place a marker identifying the requesting client and the service to be provided in a timed storage location of said timeline corresponding to the available time, and a map scheduler configured to retrieve markers in a time window of said timeline and build a MAP message that describes time interval allocation on an upstream channel for said time window.

The present invention includes a method of service scheduling of an upstream channel in a point to multi-point communication system, wherein said point is a hub device, and said multi-point is a set of client devices communicating with said hub, comprising the steps of, scheduling said services in a timeline so as to identify a client device, building a MAP message comprising at least a portion of the services scheduled in said timeline, and communicating said timeline to said client devices.

Both the device and method may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
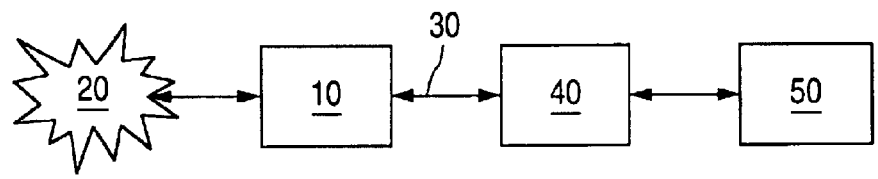
FIG. 1 is an overview of a known wireless data over cable system.
Figure 2:
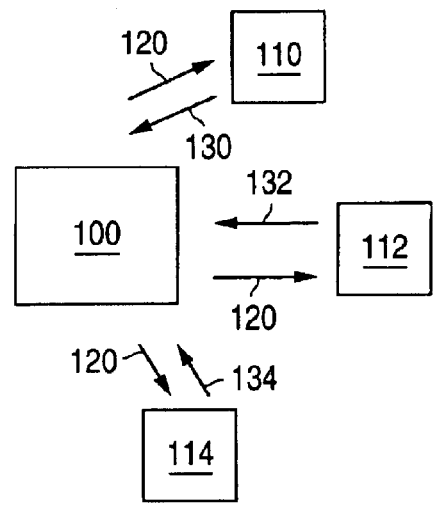
FIG. 2 is a block diagram of a wireless hub communicating with a plurality of wireless modems in a broadband wireless access system according to a presently preferred embodiment of the present invention.

Referring again to the drawings, wherein like reference numerals designate identical or corresponding parts, and more particularly to FIG. 2 thereof, there is illustrated [ . . . ].

Referring to FIG. 2, in the presently preferred embodiment, a wireless hub communicates with a number of wireless modems 110, 112 and 114 on downstream channel 120 and upstream channels 130, 132 and 134 respectively. The wireless hub by determining the load and other performance characteristics of each upstream channel 130, 132 and 134 can assign in the next allocation MAP any of the wireless modems 110, 112 or 114 to another upstream channel of a group of upstream channels assigned by the wireless hub to the wireless modem 110, 112 or 114. This can be an assignment of one of the wireless modems to a same upstream channel as another wireless modem, e.g. assigning wireless modem 110 to upstream channel 132, or assignment to a completely different upstream channel, e.g. assigning wireless modem 112 to upstream channel 136 (not shown). Each of the wireless modems utilizes some of a plurality of different services provided by the wireless hub. Such services include video and voice IP.

Figure 6:
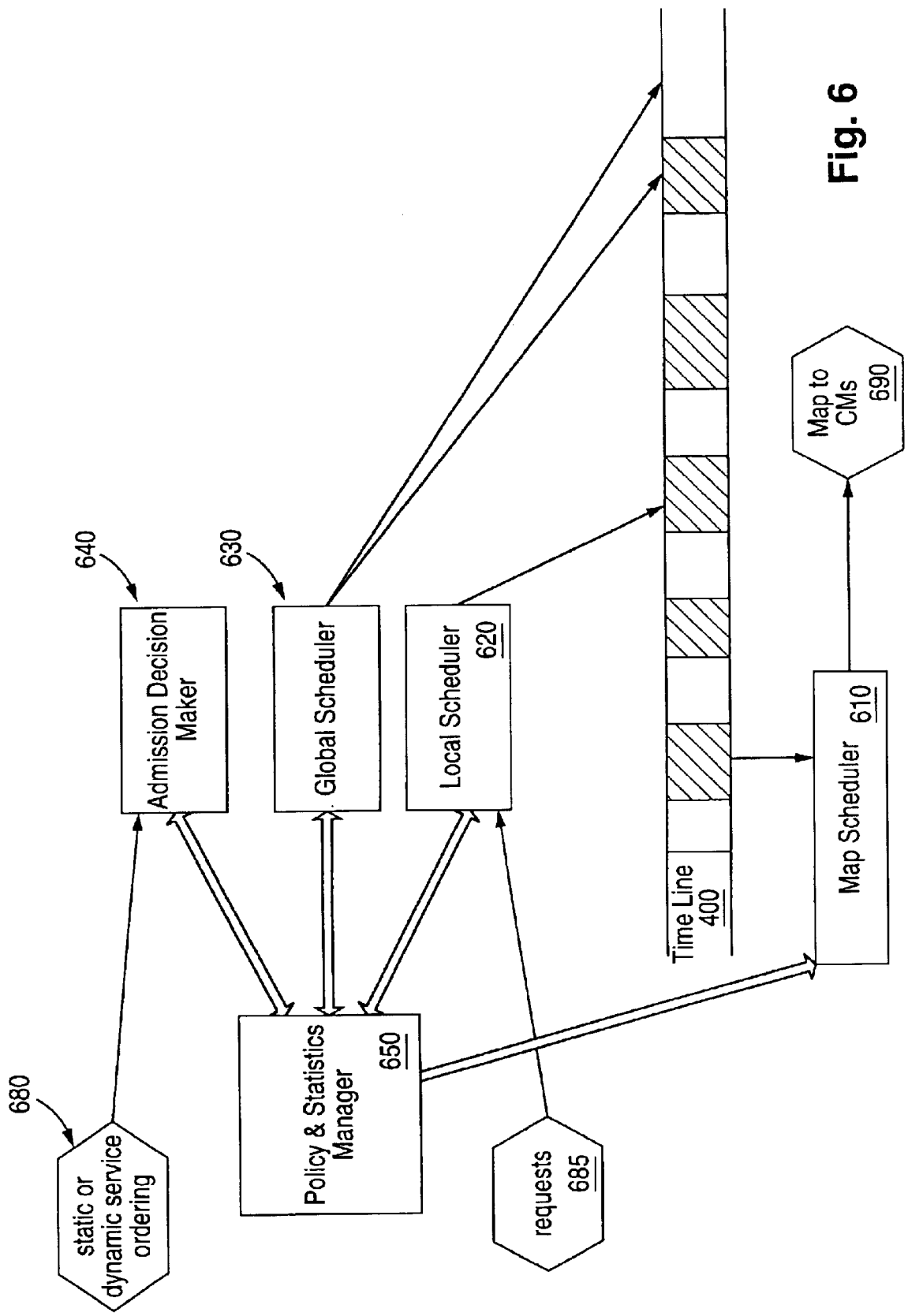
FIG. 6 is a flow chart illustrating processes and data flow in an embodiment of the present invention.

Turning now to FIG. 6, there is illustrated a Quality of Service architecture 600 consistent with an embodiment of the present invention.

The QoS Architecture 600 includes five architectural levels: (1) Map Scheduler 610; (2) Local Scheduler 620; (3) Global Scheduler 630; (4) Admission Decision Maker 640; and (5) Policy & Statistics Manager 650.

The following table shows the presently preferred main data structures used in the inventive scheduling method and system:

| Name | Comments | Access |
| --- | --- | --- |
| Time Line | the sequence of Time Line Elements ordered by time | Map Scheduler - r/o Local & Global Scheduler - r/w |
| Bandwidth Requests | As defined by DOCSIS | Map Scheduler - n/a Local Scheduler - r/o Global Scheduler - n/a |
| Maps Ack Requests | As defined by DOCSIS | Map Scheduler - r/w Local Scheduler - n/a Global Scheduler - n/a |
| Services Description | Set of parameters based upon DOCSIS definitions | Map Scheduler - n/a Local Scheduler - r/o Global Scheduler - r/w |

Legend:
r/o - read only,
r/w - read and write, and
n/a - no access.

It should be noted that the present invention can operate as long each of the pieces of information discussed is provided and utilized appropriately, and is not limited to the specific data structures or names utilized.

The Map Scheduler 610 is a mechanism that constructs map messages in accordance with the Data Over Cable System Interface Specification (DOCSIS) Radio Frequency Specification, SP-RFIvv1.1-I03-991105, standard which are then sent out, which is incorporated herein in its entirety by reference as if fully set forth herein.

Further DOCSIS scheduling information is discussed in DOCSIS Specification #SP-OSSI-I03-990113, which is also incorporated herein by reference as if fully set forth herein in its entirety.

The Map Scheduler 610 is not provided information regarding incoming bandwidth requests by the wireless modems (or CMS). It operates on the basis of information retrieved from a Time Line 400, into which the higher scheduler levels may have placed grants. It also takes into account the Ack Requests queue. The Map Scheduler sets actual Map sizes and the time of sending a Map Message to the wireless modem(s) (or cable modems, CMs, etc.) in accordance with a given policy. That policy is maintained or determined by the Policy and Statistics Manager 650.

Figure 5:
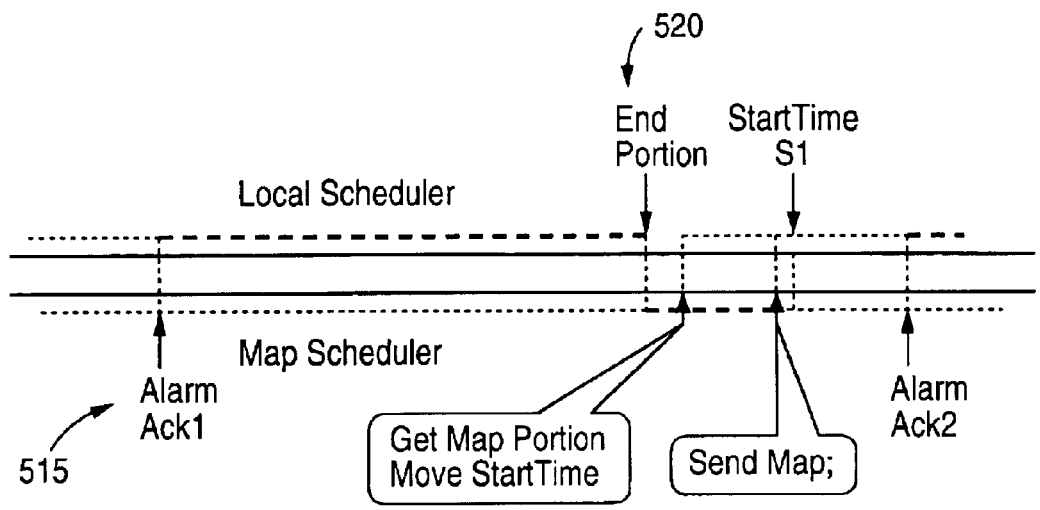
FIG. 5 is a diagram of the interaction of local scheduler and map scheduler according to a presently preferred embodiment of the present invention.

As illustrated in FIG. 5, the Map Scheduler 610 operates in conjunction with the Time Line 400 when an alarm occurs. For example, when an alarm 515 occurs, the Map Scheduler starts functioning by reading the Ack Time Register (this switches the banks of acknowledgement requests and bandwidth requests) and inserts it and the acknowledgements into the Map Message. It then extracts a portion of elements from the Time Line [from a start time 415 to end portion 520 ], shifts the Start Time pointer 415, and proceeds with the construction of the Map Message. (It also processes the Local and Grant Boundary pointers—see below regarding the Time Line Implementation).

When constructing the map, the Map Scheduler inserts "pending" for all grants allocated in the Time Line and not included in the current map. A supplementary table, referred herein as the Grant Time Table, is preferably used for that purpose.

Figure 7:
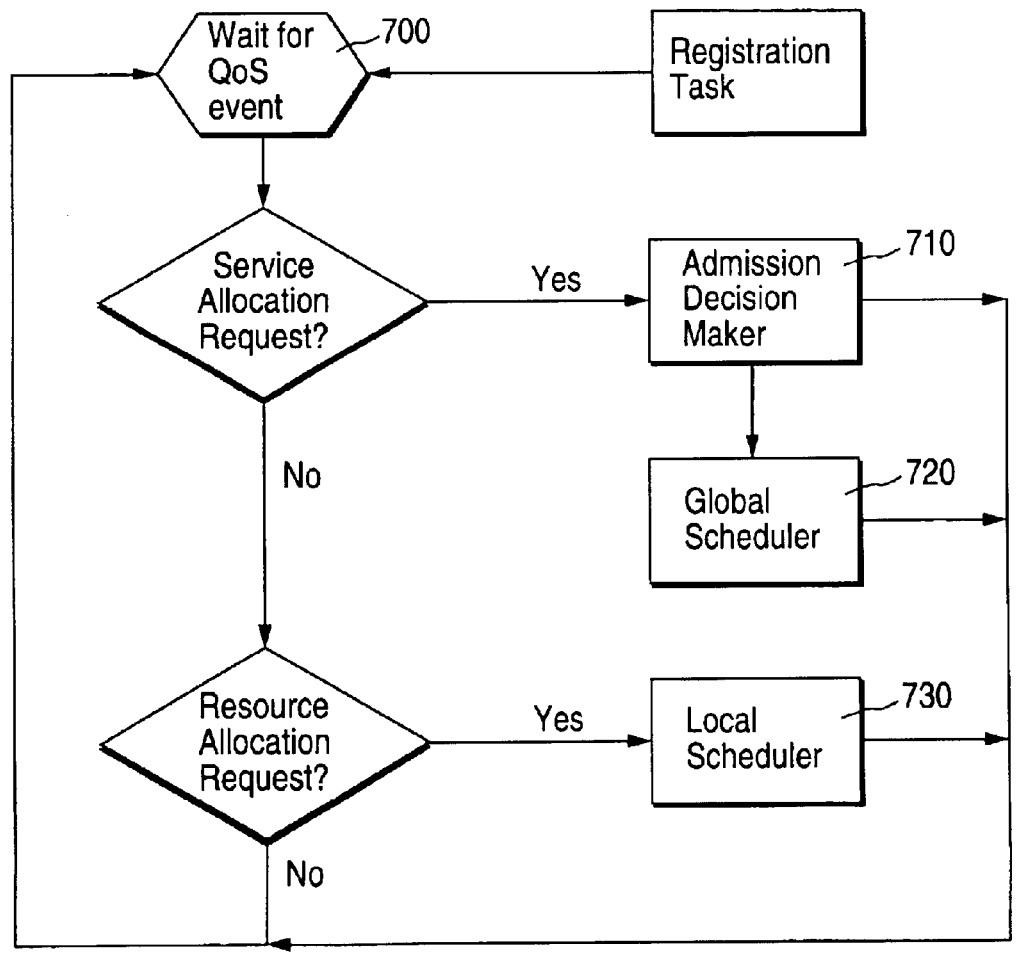
FIG. 7 is a flow chart illustrating a service/bandwidth request processing loop according to an embodiment of the present invention.

The timeline is constructed in a service/bandwidth request processing loop. Illustrated in FIG. 7 the service/bandwidth request processing loop beings in a wait state 700 for a QoS (Quality of Service) event, such as a request from a modem. If the request is a service allocation request, the Admission Decision Maker 640 either admits or rejects the request. If admitted, the request is sent to the Global Scheduler 630 for inclusion on the Time Line. If the request is a resource allocation request, it is forwarded to the Local Scheduler 620 for allocation on the timeline.

The Local Scheduler 620 processes incoming bandwidth requests and generates data grants in accordance with the Service, registered for the requesting SID (Station ID). The Local Scheduler 620 does not operate in terms of maps, its purpose is to place data grants into the Time Line, to be ready for assignment by the Map Scheduler.

The Local Scheduler 620 is the most responsive to real-time processes and requests. It preferably must guarantee the appropriate processing of all incoming requests. Enforcement is described below with respect to Grant Provisioning.

When making decisions on providing grants, the Local Scheduler 620 utilizes algorithms necessary to model the services supported, e.g. the video or Voice IP services. The modeling parameters of the service are set at the Global Scheduler level when the Service has been admitted for the SID in question. For example, a Token Bucket scheme works at this level. Also, if a Fragmentation Mechanism is not implemented, when issuing a data grant, the Local Scheduler finds a non-occupied segment of the Time Line, a "hole", in a most optimal way.

Figures 8, 9:
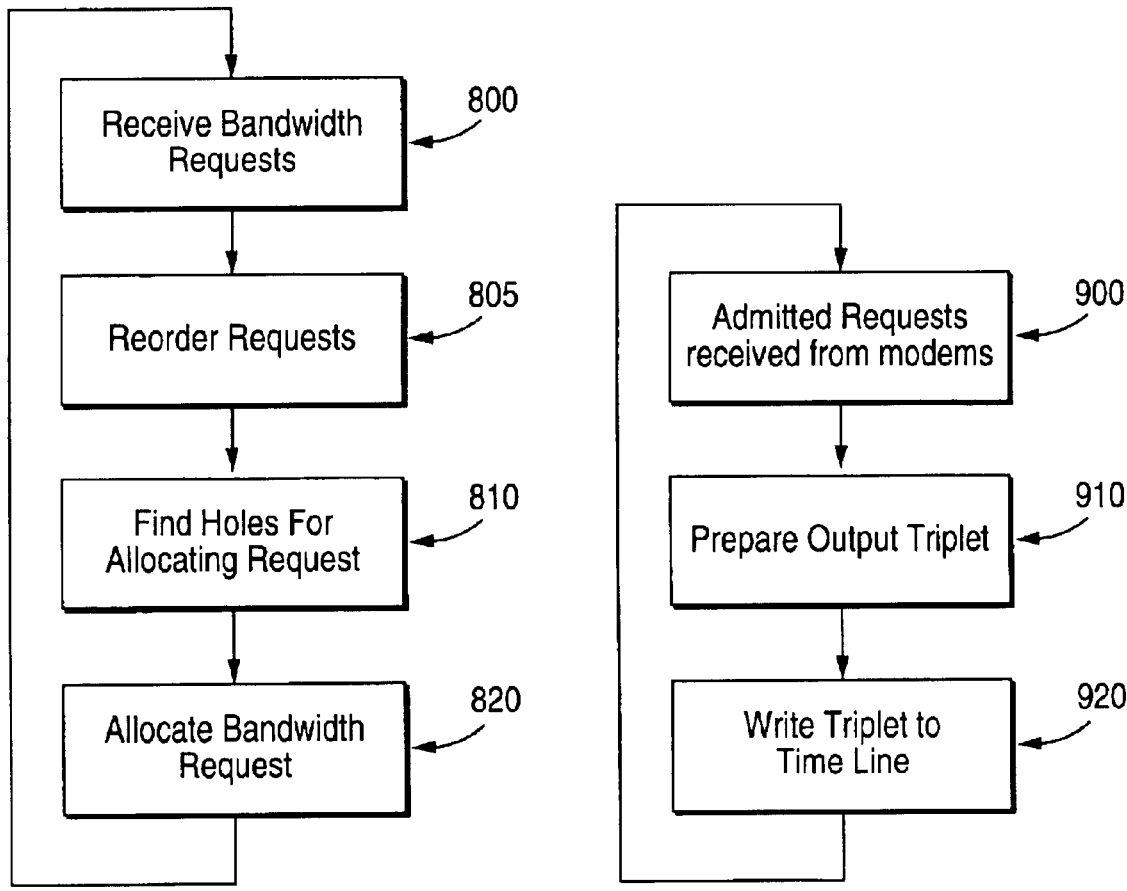
FIG. 8 is a flow chart illustrating a high level view of Local Scheduling according to an embodiment of the present invention.
FIG. 9 is a flow chart of the Global Scheduling process according to an embodiment of the present invention.

FIG. 8 illustrates a flow chart of basic Local Scheduling according to an embodiment of the present invention. At step 800, a bandwidth or other resource allocation request is received. At step 805, the received bandwidth requests are ordered based on service parameters. Any ordering algorithm may be utilized, such as the fair-rate queuing algorithms discussed below. The local scheduler then takes the request having the highest priority and finds a suitable hole or holes (empty mini-slots) in the local time window to service the high priority request (step 810), and allocates them into the holes of available mini-slots in the timeline (step 820). Bandwidth requests are preferably allocated from empty mini-slots (holes) within the Local Time Window, however, requests may be allocated before the Grant Boundary 460.

The main function of the Global Scheduler 630 is to provide preliminary global time scheduling for SIDs according to the admitted Static and Dynamic Services by marking the Time Line with periodic potential or actual Time Line Elements (grants). This marking is carried out on the basis of the admitted services' parameters. FIG. 9 illustrates a high level flow chart of the Global Scheduling process according to an embodiment of the present invention. At step 900, admitted service allocation requests are received by the Global Scheduler 630. The Global Scheduler prepares an output triplet reflecting the parameters of the admitted service (step 910), and the triplet is written to the Time Line (step 920).

It is also the responsibility of the Global Scheduler 630 to manage the grant of periodic ranging request opportunities. This is done by placing grants into the Time Line, including the Global Area.

The Global Scheduler 630 provides bandwidth allocation for SIDs in the Time Line, in both the Local Time Window and the Global Area. This is done for admitted Services.

The Admission Decision Maker 640 processes incoming requests for Static and Dynamic Service ordered by the wireless modems. This Quality of Service scheduling architectural level is responsible for processing of such requests in accordance with the DOCSIS standard. The decision is made by analyzing the Model while attempting to incorporate specific Resource Estimations obtained from the Policy Architectural Level into the Model. When a Service is admitted, the Global Scheduler fills out Service Description data.

For both Static or Dynamic Service ordering, resource consumption is forecasted and estimated. This is the responsibility of the Policy Level (Policy & Statistics Manager 650). Resource estimation is provided on the base of information on the type of the application, running on the remote PC, history of processing, if available, statistics, etc.

Two important examples of services that require Resource Estimation are the Unsolicited Data Grant with Activity Detection and the Best Effort services.

The Admission Decision Maker 640 component checks whether it is possible to include the new service together with its Resource Estimation into the Admission Resource Model. The Admission Resource Model is represented by the Time Line (its Global Area only) in the same way as is done for the Global Scheduler. The Admission Decision Maker 640 provides periodic comparison of the real life Time Line allocation with that of the Admission Resource Model. If the actual behavior of a SID does not correspond to the Admission Resource Model forecast, then a correction of the Model is made. This correction is passed over to the Policy Level.

For example, consider a SID ordered for Unsolicited Data Grant with Activity Detection. The Policy Level analyzes the nature of this SID on the basis of available statistics. It then forecasts its activity behavior. The output of this stage is an Estimated Resource, represented in the form of a periodic triplet. This Estimated Resource is recommended to be used by the Admission Decision Maker.

The Admission Decision Maker periodically compares the Model with the real Time Line Allocation. For example, it sees, that our SID consistently overflows the Estimated Resource previewed by the Model. This means that the analysis by the Policy Level has been incomplete and needs correction.

Docsis Implementation

Unsolicited Grant Service

The parameters used in the presently preferred unsolicited grant Service are the same as those used in the DOCSIS specification.

The Global Scheduler Level generates a (periodic) actual grant triplet in accordance with the service parameters and invokes the Global Time Line Allocation routine.

Best Effort Implementation

The parameters used in the presently preferred best effort implementation are the same as those used in the DOCSIS specification.

The Local Scheduler receives bandwidth requests, queues them and decides on the order in which they are granted so that the minimal reserved rates of each user be satisfied. This may be implemented using one of the published fair queuing algorithms. For example, *Network Delay Analysis Of A Class Of Fair Queuing Algorithms*, by S. J. Golestani, IEEE Journal on Selected Areas of Communications, vol 13, no. 6, Aug. 1995, p 1057–1070; *Rate-Proportional Servers: A Design Methodology For Fair Queuing Algorithms*, by D. Stiliadis and A. Varma, IEEE/ACM Transactions on Networking, Apr. 1998; and *Efficient Fair-Queuing Algorithms For Packet-Switched Networks*, by D. Stiliadis and A. Varma, IEEE/ACM Transactions on Networking, Apr. 1998.

The Local Scheduler also invokes the Token Bucket Mechanism which can allow or disallow a grant. If a grant is to be given, the Local Scheduler 620 puts it into the Local Time Window 410.

The Time Line utilized in the process is preferably a virtual timeline. The measurement unit is a minislot. The Time Line represents bandwidth allocation from a time point called Start Time 415. An allocation may be a preventive one. This means that it is possible to modify it later. For example, a potential grant given by a Best Effort service may be turned into an actual grant later. Another example of a later modification to a Best Effort grant is shifting a grant in correspondence with its jitter specification.

Figure 4:
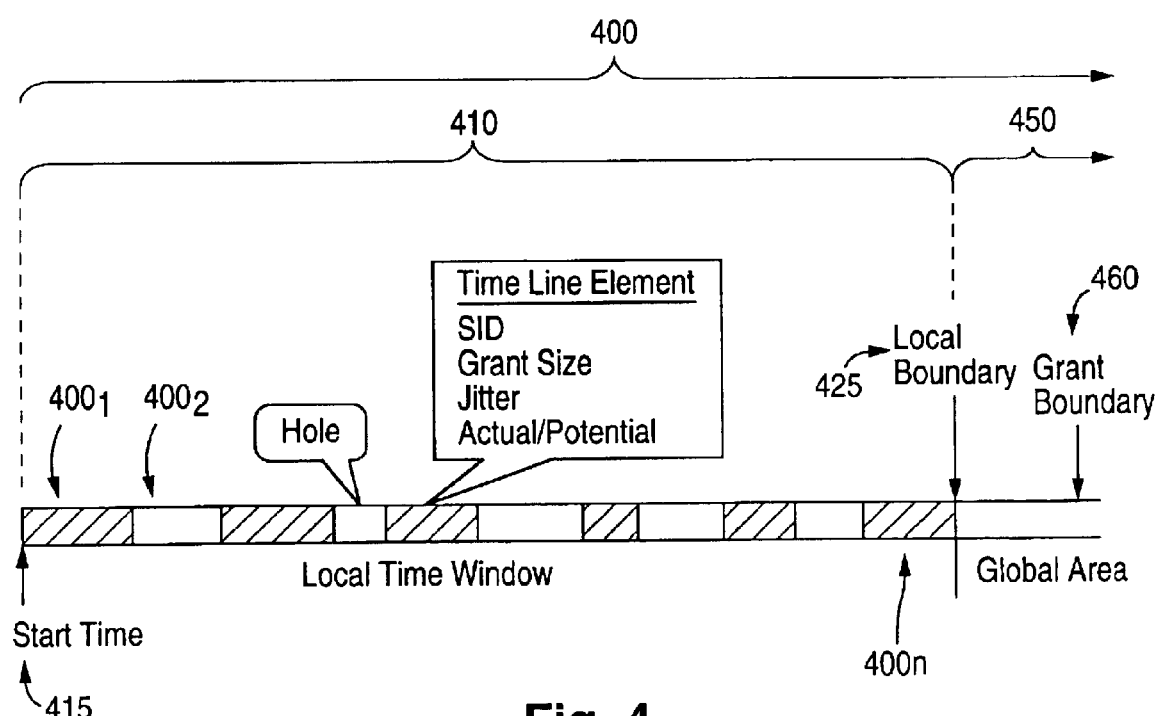
FIG. 4 is a diagram of time line with a local time window and global area according to a presently preferred embodiment of the present invention.

Referring now to FIG. 4, a Time Line 400 is divided into two areas—a Local Time Window 410 and a Global Time Area 450. A Local Boundary 425 is the separating point between the Local Time Window and Global Time Area. The Local Time Window 410 is an area from a Start Time 415 till the Local Boundary 425, while the Global Time Area 450 is from Local Boundary 425 and into infinity.

In one embodiment, two ways are utilized for placing data grants into the Time Line: (1) Global Periodic Allocation; and (2) Local Allocation. Global Periodic Allocation marks the whole Time Line, including the Global Area, while Local Allocation marks only the Local Time Window. Global Periodic Allocation is invoked by the Global Scheduler, when the scheduler is admitting the Unsolicited Grant Service or when admitting Minimal reserved rate for the Best Effort service. It is also used for providing periodic ranging request opportunities to the wireless modems. Local Allocation is used by the Local Scheduler for processing bandwidth requests.

Referring again to FIG. 4, the Local Time Window 410 is preferably an array of Time Line Elements (410₁, . . . 410n), while the Global Time Area 450 is preferably a table of periodic triplets, however, the table may be empty.

As used herein the term triplets is preferred to mean that a Triplet (i, n, k) is interpreted as a periodic filling of the infinite Time Line tail, as follows: in each sequential portion of n minislots a group of k minislots starting from i is reserved.

Figure 3:
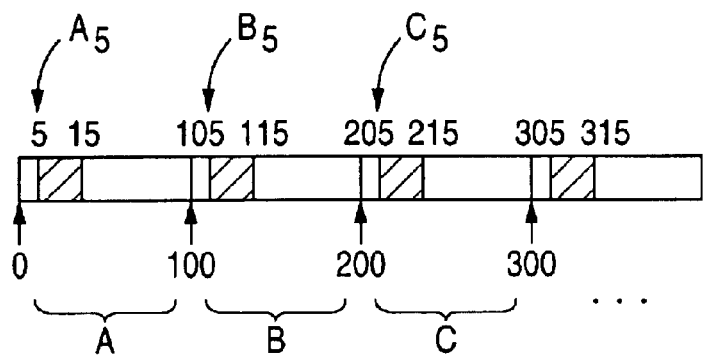
FIG. 3 is a diagram of an allocation in a global area of a time line according to a presently preferred embodiment of the present invention.

Referring again to FIG. 3, Triplet (5, 100, 10) would means the allocation of the Global Area of the Time Line as depicted therein. For example, as shown in FIG. 3, every set of 100 minislots (A,B,C, . . . etc), 10 minislots are allocated (note dark areas on time line) starting with the 5th minoslot (A5, B5, C5 . . . etc) in each set.

Global Periodic Allocation orders triplets on the Time Line by specifying only two of the parameters, n and k. A Triplet Distribution algorithm is used to generate component i of the triplet. The Triplet Distribution algorithm, described with respect to FIG. 3, distributes triplets in order to avoid excessive holes. For example, in FIG. 3, the triplets are allocated in every set of 100 (e.g., A, B, or C . . . ), starting with the 5th available slot (e.g., The size of the Local Time Window 410 is determined by the value of the Local Boundary 425. A pointer to the Time Line that informs the Local Scheduler of the appropriate distance for Local Grant Allocation. The Local Scheduler does not place an actual grant into the Time Line for a time that is greater than a Grant Boundary 460. Note, that the Grant Boundary 460 should be no less than the Local Boundary.

The Local Time Window 410 is updated every time the Map Scheduler moves the Start Time Pointer. The grants allocated by periodic triplets are inserted into the array of Time Line Elements filling up the Local Time Window 410 till the Local Boundary 425.

The Grant Time Table is a supplementary structure that gives a compressed representation of the Time Line. It is used by the Map Scheduler 610 for fast insertions of "pending" into Map Messages. The Grant Time Table contains a list of links to data grants in the Time Line, the list is sorted by time.

The Hole List is a list of "holes", e.g. ungranted minislots. It is used by the Local Grant Allocation algorithm. The Hole List may be sorted by size, allowing for fast finding of holes for allocations.

The following table provides functions that are preferably used with a Time Line API Interface according to the present invention:

| | |
|---|---|
| Get | Get an element of the Time Line. |
| Put | Put an element into the Time Line. |
| GetPortion | Get a number of elements in a time interval. Used by Map Scheduler |
| BeginSession | Close access to the Time Line till EndSession. Used for synchronization. |
| EndSession | Open access to the Time Line. Used for synchronization. |
| PutPeriodicAlocation | Place a triplet into the Global Time Area. |
| GetPeriodicAlocation | Get a triplet from the Global Time Area. |

Preferably they are external, to the scheduler functions and applications, APIs that used by the external components and are used at low level implementations. These may for example exist in portions of the network management system. The following external and low level APIs are preferably for resource driven and inner usage.

Outside APIs

1. AllocateRequestPortion

Functionality:

Allocates the portion of requests (with the same Acktime) in Time Line;

Guarantees that all the requests in portion are processed (Map Scheduler is able to call GetMapPortion to prepare the Map for sending)

Keeps the given temp of request processing.

2. GetMapPortion

Parameters:

PortionSize—desirable portion size in minislots

ElemAmount—maximal amount of elements in portion.

Functionality:

Cut out the portion of elements from Time Line and provides the portion for Map Scheduler preparation.;

Moves the Local Time Window (changes StartTime pointer and fills the Local Time Window using the Global Area).

More detail:

Reduces the portion in case of last grant cutting or inconsistency of the parameters.

Removes the last gap according to jitter.

Restores reservation for time line not included to portion.

Low Level APIs

1. LocalReservAllocation(Grant)

Parameter: Grant structure (SID, Grant Size, Jitter, Actual/Potential)

Functionality:

Looking for a location in Time Line for a given grant.

Uses a correspondent reserved area while a reservation is done for a given SID.

If the reserved area is not found or the size is overflow the reserved area, the grand would be allocated by nonreserved local allocation mechanism.

Uses jitter to move the allocated grant as early as possible.

2. LocalAllocation (Grant)

Parameter: Grant structure (SID, Grant Size, Jitter, Actual/Potential)

Functionality:

Looking for a location in Time Line for a given grant.

Uses a reserved area while corresponding request is not present.

Provides the holes collection in according to allocated grant jitters.

3. RestoreReservation ( )

Functionality:

Restores freed reserved areas.

In case of grant allocation on the reserved area place, de-allocates of the grant and put it to the queue for further hot allocation.

Provides allocation for de-allocated grants.

The following description of an embodiment of a token bucket mechanism according to the present. For each SID that has ordered a best effort service, the Local Scheduler keeps at least the following information:

| R | Maximum sustained traffic rate (service parameter) |
| --- | --- |
| B | Maximum traffic burst (service parameter) |
| TokenTime | The last time (in minislots) when the token amount was calculated |
| TokenSize | The amount of tokens (in minislots) accumulated till moment TokenTime |

The Local Scheduler preferably performs as follows:

When Best Effort service is ordered TokenSize is set to zero.

When, at moment AckTime, a modem requests a grant of N minislots.

TokenSize is updated, for example, as follows:

$$TokenSize=min(TokenSize+R*(AckTime-TokenTime), B).$$

Data grant, for example, is provided by the rule:

```
if( N < TokenSize) {
            Grant is given;
            TokenSize = TokenSize - N;
}
else
    Grant is not given; //request discarded
```

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, accepting services from client devices (modems), building a timeline, granting periodic allocations in a global part of the timeline, granting bandwidth requests in a local time window and global part of said timeline, building MAP messages based on time grants in the timeline, sending the MAP message to the various client devices (modems), and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A wireless communication system, comprising:
 a wireless hub configured to send downstream communications on at least one downstream channel and receive upstream communications from at least one client device on at least one upstream channel;
 wherein:
 said wireless hub comprises,
 a timeline, having timed storage allocations for scheduled services to be provided in conjunction with at least one client device that is communicating with said wireless hub,
 a scheduling mechanism configured to,
 receive service requests from said client devices,
 determine available time for provision of the requested service, and
 place a marker identifying the requesting client and the service to be provided in a timed storage location of said timeline corresponding to the available time, and
 a scheduler configured to retrieve markers in a time window of said timeline and build a message that describes time interval allocation on an upstream channel for said time window;
 said scheduler comprises,
 a global scheduler configured to make allocations in said time line for preliminary global time scheduling for STATION IDs according to the admitted Services by marking the Time Line with periodic potential or actual Time Line Elements (grants), and
 a local scheduler configured to process incoming bandwidth requests and generate data grants in accordance with a service, registered for the requesting client;
 said timeline comprises,
 a local window comprising an array of time line elements, and
 a global window comprising a table of periodic triplets;
 said local scheduler is further configured to search for holes in said array of time line elements and assign said bandwidth requests to said holes;
 said local scheduler includes a hole list comprising a list, sorted by size, of unallocated contiguous mini-slots; and
 said search comprises matching a bandwidth request to said hole list.

2. The wireless communication system according to claim 1, wherein said wireless communication system is a broadband wireless access system.

3. The wireless communication system according to claim 1, wherein said client devices are Wireless Modem Units.

4. The wireless communication system according to claim 1, wherein said timeline is a data structure having a set of timeline elements including a STATION ID, identifying a requesting client, GRANT SIZE, identifying an amount of time allocated to a corresponding STATION ID, JITTER, identifying an amount of jitter associated with the corresponding STATION ID, and Actual/Potential, identifying whether the timeline element is an actual time grant or a potential element based on potential use of a subscribed service.

5. The wireless communication system according to claim 4, wherein said potential use of a subscribed service is a minimal Reserved Rate in the frame of a Best Effort service.

6. The wireless communication system according to claim 1, wherein said wireless hub further comprises an admission device that accepts and approves services ordered by said client devices.

7. The wireless communication system according to claim 6, wherein said services ordered include minimal reserved frame rates in a best effort type service.

8. The wireless communication system according to claim 1, wherein said scheduler includes a model configured to determine time grants needed for supported services.

9. The wireless communication system according to claim 1, wherein said timeline is a data structure having a set of timeline elements including a STATION ID, identifying a requesting client, GRANT SIZE, identifying an amount of time allocated to a corresponding STATION ID, JITTER, identifying an amount of jitter associated with the corresponding STATION ID, and Actual/Potential, identifying whether the timeline element is an actual time grant or a potential element based on potential use of a subscribed service.

10. A wireless communication system, comprising:
 a wireless hub configured to send downstream communications on at least one downstream channel and receive upstream communications from at least one client device on at least one upstream channel;
 wherein:
 said wireless hub comprises,
 a timeline, having timed storage allocations for scheduled services to be provided in conjunction with at least one client device that is communicating with said wireless hub,
 a scheduling mechanism configured to,
 receive service requests from said client devices,
 determine available time for provision of the requested service, and
 place a marker identifying the requesting client and the service to be provided in a timed storage location of said timeline corresponding to the available time, and
 a scheduler configured to retrieve markers in a time window of said timeline and build a message that describes time interval allocation on an upstream channel for said time window;
 said scheduler comprises,
 a global scheduler configured to make allocations in said time line for preliminary global time scheduling for STATION IDs according to the admitted Services by marking the Time Line with periodic potential or actual Time Line Elements (grants), and
 a local scheduler configured to process incoming bandwidth requests and generate data grants in accordance with a service, registered for the requesting client;
 said timeline comprises, a local window comprising an array of time line elements, and a global window comprising a table of periodic triplets;

said local scheduler is further configured to search for holes in said array of time line elements and assign said bandwidth requests to said holes; and said global scheduler assigns said grants in a table of periodic triplets, including, i, n, k, in which each group of n mini-slots, starting from the $i^{th}$ mini-slot, a group of k mini-slots is assigned.

11. The wireless communication system according to claim 10, wherein said scheduler includes a model configured to determine time grants needed for supported services.

12. The wireless communication system according to claim 10, wherein said timeline is a data structure having a set of timeline elements including a STATION ID, identifying a requesting client, GRANT SIZE, identifying an amount of time allocated to a corresponding STATION ID, JITTER, identifying an amount of jitter associated with the corresponding STATION ID, and Actual/Potential, identifying whether the timeline element is an actual time grant or a potential element based on potential use of a subscribed service.

13. The wireless communication system according to claim 10, wherein said wireless communication system is a broadband wireless access system.

14. The wireless communication system according to claim 10, wherein said client devices are Wireless Modem Units.

15. A wireless communication system, comprising:

a wireless hub configured to send downstream communications on at least one downstream channel and receive upstream communications from at least one client device on at least one upstream channel;

wherein:

said wireless hub comprises, a timeline, having timed storage allocations for scheduled services to be provided in conjunction with at least one client device that is communicating with said wireless hub, a scheduling mechanism configured to, receive service requests from said client devices, determine available time for provision of the requested service, and place a marker identifying the requesting client and the service to be provided in a timed storage location of said timeline corresponding to the available time, and a scheduler configured to retrieve markers in a time window of said timeline and build a message that describes time interval allocation on an upstream channel for said time window;

said wireless communication device further comprises a timeline applications programming interface configured to set and retrieve time storage allocations to/from said timeline;

said timeline further comprises a local window comprising an array of time line elements, and a global window comprising a table of periodic triplets; and said timeline applications programming interface includes functions for at least one of Get, configured to get an element of the timeline, Put, configured to put an element on the timeline, GetPortion, configured to get a number of elements in a time interval, BeginSession, configured to close access to the timeline until and end of a session, EndSession, configured to open access to the timeline, PutPeriodicAllocation, configured to place a triplet into the global time area, and GetPeriodicAllocation, configured to get a triplet from the global time area.

16. The wireless communication system according to claim 15, wherein said scheduler includes a model configured to determine time grants needed for supported services.

17. The wireless communication system according to claim 15, wherein said client devices are Wireless Modem Units.

18. The wireless communication system according to claim 15, wherein said wireless communication system is a broadband wireless access system.

* * * * *